United States Patent [19]

Harasawa

[11] Patent Number: 5,590,013
[45] Date of Patent: Dec. 31, 1996

[54] ELECTRIC-SUPPLY-SWITCH RELAY-CIRCUIT

[75] Inventor: Shinichiro Harasawa, Kawasaki, Japan

[73] Assignee: Fujitsu Limited, Japan

[21] Appl. No.: 605,655

[22] Filed: Feb. 22, 1996

Related U.S. Application Data

[63] Continuation of Ser. No. 99,188, Jul. 29, 1993, abandoned.

[30] Foreign Application Priority Data

Nov. 30, 1992 [JP] Japan ................................. 4-319825

[51] Int. Cl.⁶ .................................................. H01H 47/22
[52] U.S. Cl. ............................................ 361/187; 307/131
[58] Field of Search ........................... 361/187; 307/130, 307/131

[56] References Cited

U.S. PATENT DOCUMENTS

| | | | |
|---|---|---|---|
| 3,603,846 | 9/1971 | Toth ........................................ | 361/187 |
| 4,137,557 | 1/1979 | Ciarniello et al. .................. | 361/187 X |
| 4,140,952 | 2/1979 | Miller ................................... | 307/131 X |
| 4,402,033 | 8/1983 | Mayer . | |
| 5,113,307 | 5/1992 | Meyer et al. ............................ | 361/154 |

FOREIGN PATENT DOCUMENTS

| | | |
|---|---|---|
| 3701985 | 8/1988 | Germany . |
| 3909064 | 9/1990 | Germany . |
| 3908192 | 9/1990 | Germany . |
| 886008 | 1/1962 | United Kingdom . |

OTHER PUBLICATIONS

Kieffer, C. J.; "Simple Low Voltage Alarm"; Electronics, May 4, 1962; pp. 44, 45.

Copy of Official Action issued by German Patent Office, including translation.

*Primary Examiner*—Fritz Fleming
*Attorney, Agent, or Firm*—Greer, Burns & Crain, Ltd.

[57] ABSTRACT

An electric-supply-switch relay-circuit includes a first switch unit for passing an input current from an electric-supply line as a relay operating current; a relay for performing switching operations in accordance with the relay operating current; and a current detect control unit for detecting the input current. When the input current is found to be equal to or larger than a predetermined value necessary for operating the relay, the current detect control unit turns on the first switch unit to thereby allow the input current to the relay.

21 Claims, 6 Drawing Sheets

ELECTRIC-SUPPLY-SWITCH RELAY-CIRCUIT

This is a continuation of application Ser. No. 08/099,188 filed on Jul. 29, 1993, now abandoned.

BACKGROUND OF THE INVENTION

1. Field of the Invention

The present invention is directed to an electric-supply-switch relay-circuit, and more particularly, to an electric-supply-switch relay-circuit in which the switching operation of a relay is stabilized by means of an electronic circuit and which can be used in an undersea branch apparatus or the like.

2. Description of the Prior Art

In a submarine-cable communication system, using optical-repeater stations or the like, to supply current to said repeater stations, an under-water branch apparatus is used which branches submarine cables to a plurality of cable stations (landing stations). When there is a defect in any one of the submarine cables, said undersea branch apparatus removes the defective cable from the electric supply route in order to establish an alternative electricity supply route among the remaining cables, by using electric-supply-switch relays.

The electric-supply-switch relays used in the undersea branch apparatus each need to function as electric-supply-switch sequencers which operate under the control of the cable houses. Hence, in a more complex system in which systems are connected to each other in series, even more precise current control is necessary. Otherwise, in the worst case, a malfunction of the electric-supply sequence the will cause problems in the electric-supply routes.

However, the operating current for operating the relays varies within a certain range, and therefore, to avoid the influence of the variation in the relay operating current, certain approaches must be taken, such as the selection of the operating characteristics of the relays. However, when such an approach is taken, the relays become expensive. Further, provision of the relay operating current adjusting resistor to adjust a number of relays independently according to a predetermined connection sequence is not desirable in terms of the number of process steps, the reliability and the like.

SUMMARY OF THE INVENTION

The present invention has been made to solve such problems, and therefore, an object of the present invention is to offer an electric-supply-switch relay-circuit in which a relay operating current is accurately determined despite a variation therein by an electronic circuit so that selection and adjustment of the characteristics of the relays become unnecessary, the price of the relays is reduced, and the relays operate accurately at a predetermined current.

According to the present invention, an electric-supply-switch relay-circuit is obtainable which includes: first switch means for passing an input current from an electric-supply line as a relay operating current; a relay for performing switching operations in accordance with the relay operating current; and current detect control means for detecting the input current. When the input current is found to be equal to or larger than a predetermined value necessary for operating the relay, the current detect control means turns on the first switch means to thereby allow the input current to the relay side.

In addition, an electric-supply-switch relay-circuit is obtainable which has: current-detect means for detecting an input current from an electric-supply line; first switch means for passing an input current from an electric-supply line as a relay operating current; a relay for performing switching operations in accordance with the relay operating current; and switch control means for detecting said input current. When said input-current detected by the current-detect means is found to be equal to or larger than a predetermined value necessary for operating the relay, the switch control means turns on the first switch means to thereby allow the input current to the relay side.

Further, according to the present invention, an electric-supply-switch relay-circuit includes: current detect means for detecting an input current from an electric-supply line; first switch means for passing an input current from an electric-supply line as a relay operating current; a relay for performing a switching operation in accordance with the relay operating current; second switch means for passing a current from the current detect means to an equivalent impedance element of the relay; and switch change-over means operating in accordance with a current detect signal which is received from the current detect means. The switch change-over means turns on the first switch means and turns off the second switch means when the input current is larger than a predetermined value necessary for operating the relay. The switch change-over means turns off the first switch means and turns on the second switch means when the input current is smaller than the predetermined value.

BRIEF DESCRIPTION OF THE DRAWINGS

The present invention will be more clearly understood from the description as set forth below with reference to the accompanying drawings.

DESCRIPTION OF THE PREFERRED EMBODIMENTS

Before describing the preferred embodiments according to the present invention, examples of the related art are provided with reference to accompanying drawings (from FIG. 1 to FIG. 4(a) and 4(b)).

FIGS. 1 to 4(a) and 4(b) show examples of a conventional electric-supply-switch relay 80 and an undersea branch apparatus employing the same.

Figures 1, 2:
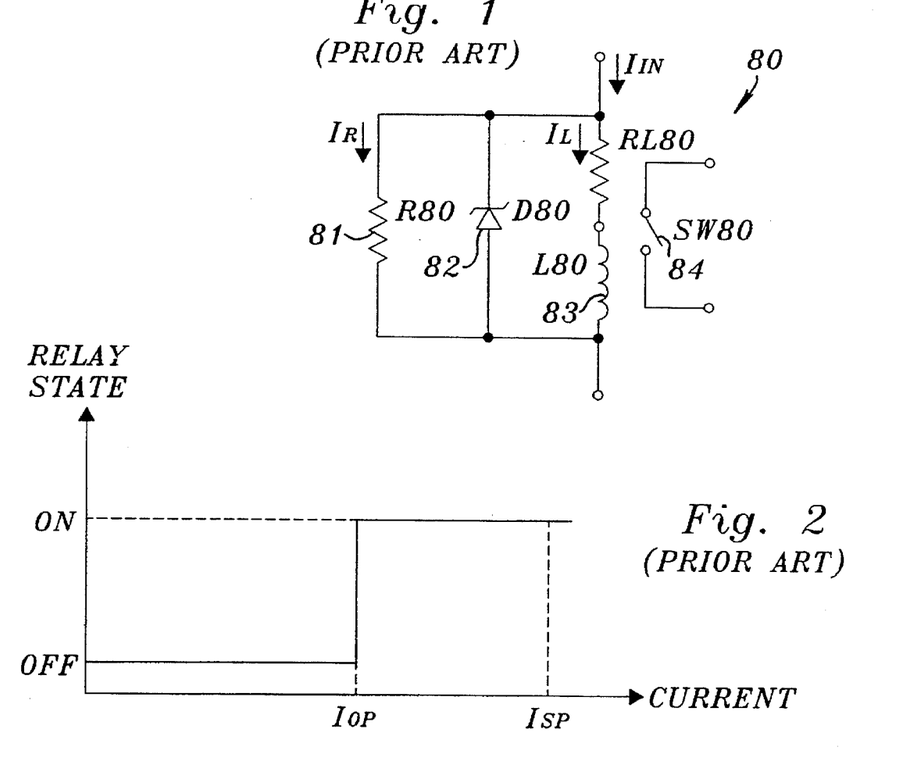
FIG. 1 is a relay-circuit diagram showing an example of a conventional electric-supply-switch relay-circuit.
FIG. 2 is a view showing relay operation characteristics.

In FIG. 1, an input current $I_{IN}$ to the electric-supply-switch relay 80 is shunted into a resistor (R80) 81 which is disposed for adjusting an operating current for a relay and a dc resistor (RL 80) of a relay coil (L80) 83 which are connected in parellel with each other ($I_R$=RL80 $I_{IN}$/(R80+RL80), $I_L$=R80 $I_{IN}$/(R80+RL80)). As can be seen in FIG. 2 which shows relay operation characteristics, when the current $I_L$ flowing in said relay coil 83 has reached a relay operating current $I_{OP}$, a relay switch (SW80) changes from a non-conductive state to a conductive state. The operating current $I_{OP}$ varies in a predetermined range due to differences between relays. The adjusting resistor 81 is used to adjust a variation in the operating current between the relays. A Zener diode (D80) 82 of FIG. 1 protects the relay coil 83 against an overvoltage such as flyback and further serves to compel the relay operation current to flow in only one direction. That is, the relay operates only when the operating current flows in a downward direction in FIG. 1. In the opposite case, because of a forward voltage in the Zener diode, the operating current is not allowed into the relay. On the other hand, an operation supporting current ($I_{SP}$) shown in FIG. 2 has, including the variation between different relays, a current value which is sufficient to keep each relay turned on.

Figure 3:
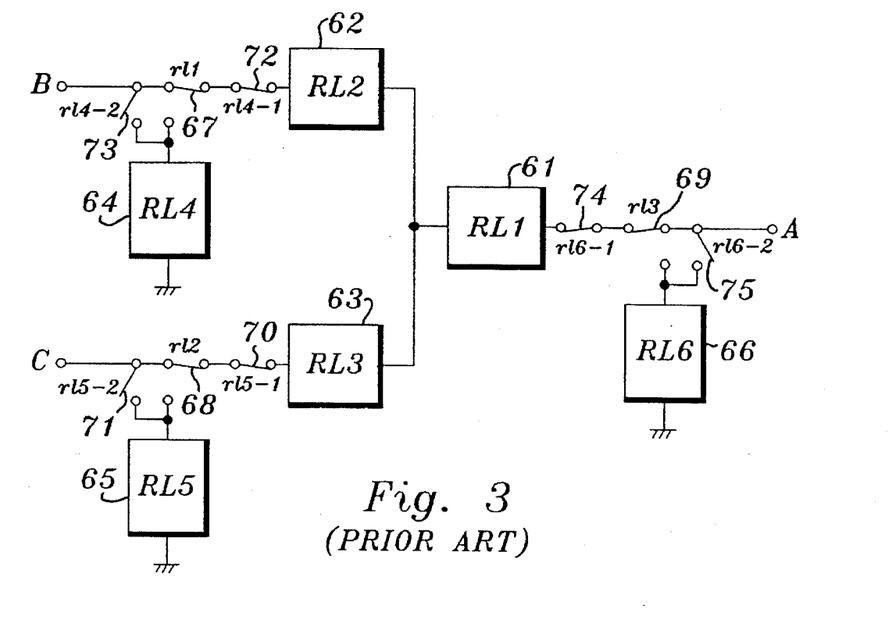
FIG. 3 is a relay-circuit diagram showing an example of a undersea branch apparatus.

FIG. 3 shows an example of an undersea branch apparatus employing the electric-supply-switch relay 80. In FIG. 3, a state before supply of current is started between cable station A, B and C which are connected to the undersea branch apparatus (i.e., an electrically starved condition).

In FIG. 3, electric-supply-switch relays (RL1, RL2, RL3) 61, 62 and 63 are disposed respectively in correspondence to the cable houses A, B and C. Further, in correspondence to said respective relays 61, 62 and 63, self-hold relays (RL4, RL5, RL6) 64, 65 and 66 are disposed which cause a latching operation of the change-over switches. The change-over switches of the relays RLx (x; 1 to 6) are indicated at reference characters rlx67 to rlx75. The dot marks () in the relays current input terminals each show a current input terminal of a current direction in which each relay can operate. Under the electrical starved condition as that shown in FIG. 3, points of the self-hold relays 67 to 75 are all disconnected from undersea earth.

Figure 4A:
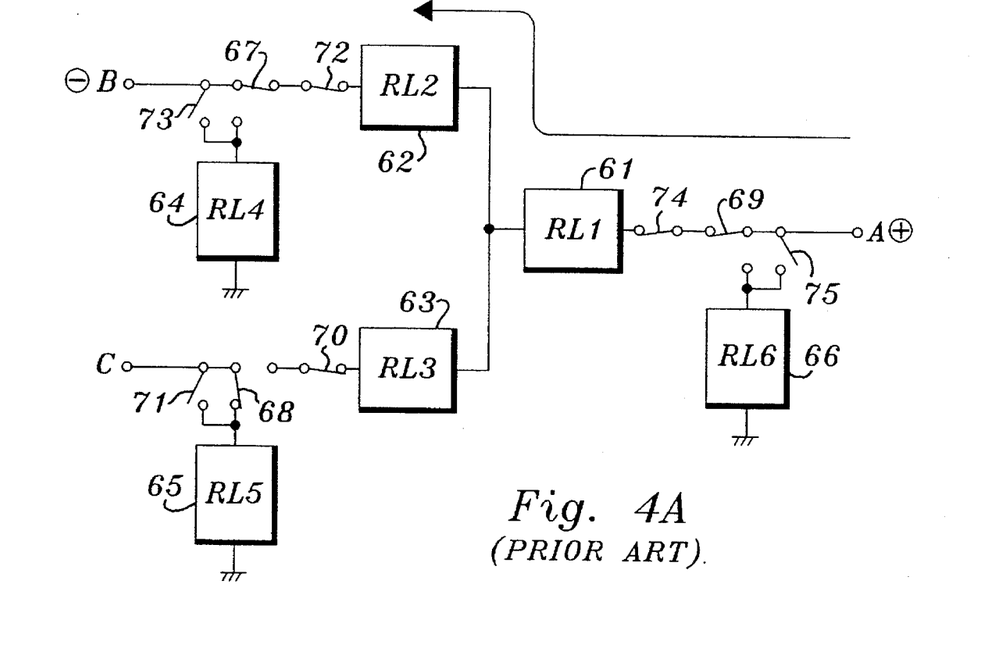
FIG. 4(a) and 4(b) are explanatory diagrams for explaining operation of the undersea branch apparatus of FIG. 3.
Figure 4B:
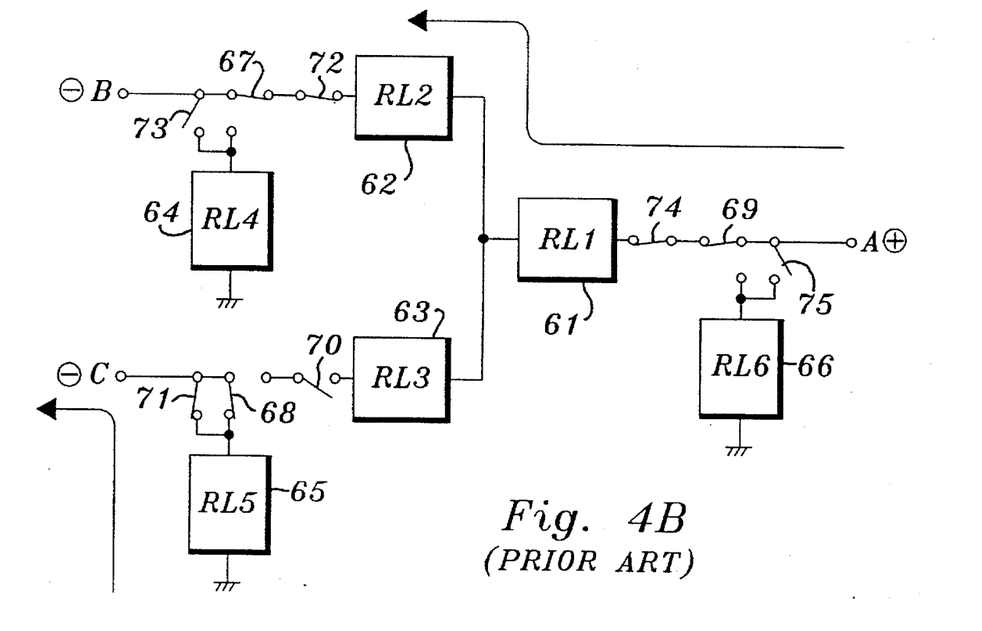

FIG. 4(a) and 4(b) are schematic explanatory diagrams for explaining the operation of the undersea branch apparatus of FIG. 3.

FIG. 4(a) shows a state in which a two-way supply of current is started between said cable stations A and B. An electric-supply current flows from the cable station A to the cable station B. Because of the direction of the electric-supply current, only the relay 62 is driven into operation and the change-over switch 68 is connected to the self-hold relay 65 side. As a result, the cable station C is disconnected from the cable stations A and B.

Next, as shown in FIG. 4(b), the cable station C starts one-way supply of current through the self-hold relay 65 which is connected to the undersea earth. Due to this electric-supply current, the change-over switches 71 and 70 of the self-hold relay 65 connect the cable station C alone to the undersea earth and further disconnect the cable station C from the electricity supply route between the cable stations A and B. Hence, independently of electric-supply or the lack of it between the cable stations A and B, it is possible that supply of current by the cable station C alone is continued. The self-hold relay 65 allows the cable station C to perform a one-way supply of electricity even when electricity supply between the cable stations A and B is stopped due to disturbances such as a fault in a cable.

As described above, the electric-supply-switch relays used in the undersea branch apparatus each need to function as an electric-supply-switch sequencer which operates under the current control of the cable houses. Hence, in a more complex system in which systems such as those shown in FIG. 3 are connected to each other in series, even more precise current control is necessary. Otherwise, in the worst case, malfunction of the electric-supply sequence and the like will cause a fault in electric-supply routes.

However, as described with reference to FIGS. 1 and 2, the operating current for operating the relays varies in a certain range, and therefore, to avoid influence of the variation in the relay operating current, some approaches must be taken such as selection of the operating characteristics of the relays. Still, when such an approach is taken, the relays become expensive. Further, provision of the relay operating current adjusting resistor 81 (FIG. 1) to adjust a number of relays independently according to a predetermined connection sequence is not desirable in terms of the number of process steps, the reliability and the like.

Figure 5A:
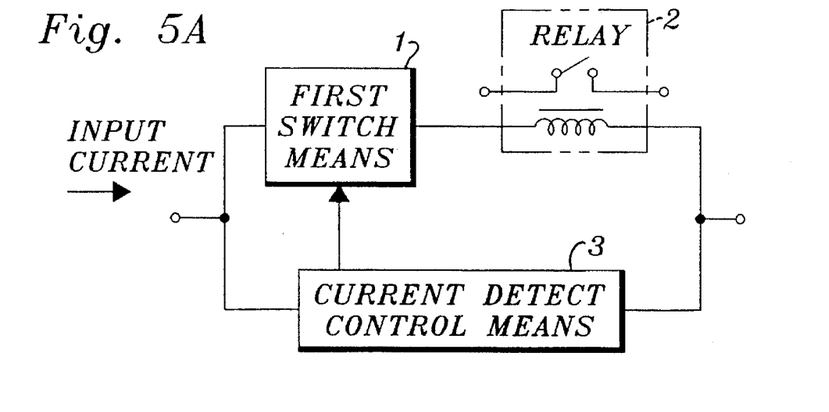
FIG. 5(a) to 5(c) are block diagrams showing a basic structure of an electric-supply-switch relay-circuit according to the present invention.
Figure 5B:
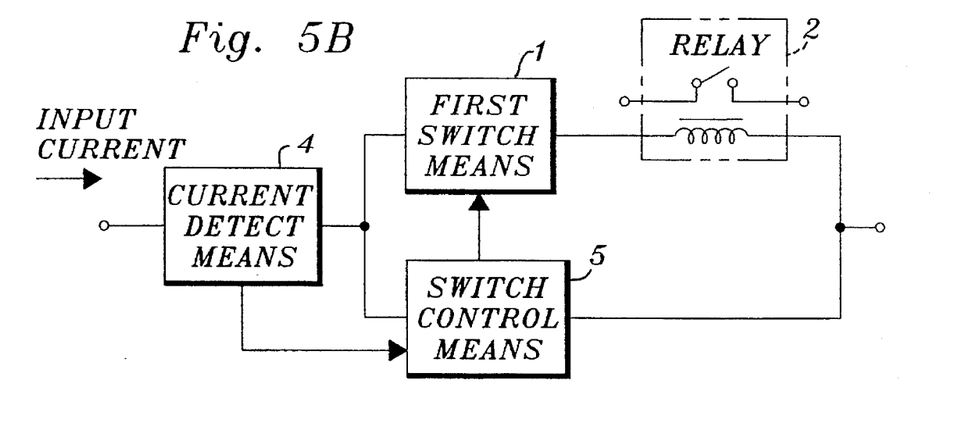
Figure 5C:
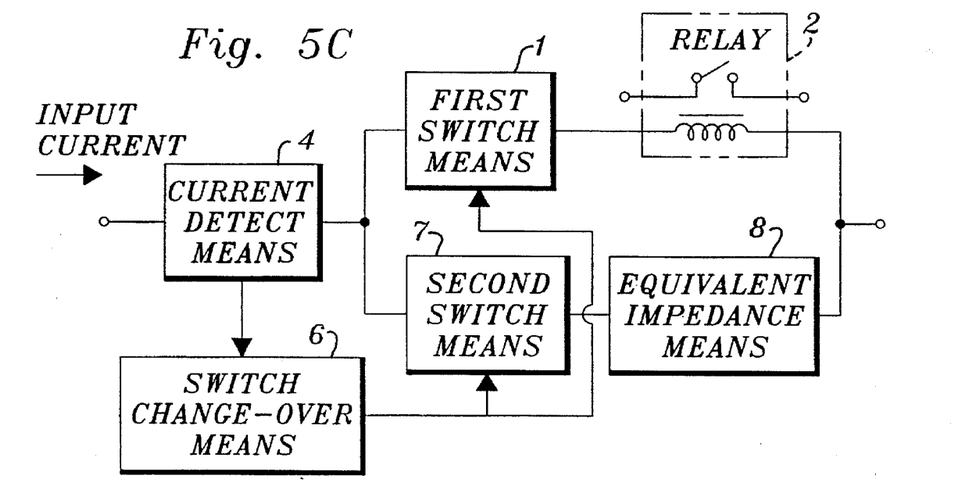

FIG. 5(a) to 5(c) are block diagrams showing a basic structure of an electric-supply-switch relay-circuit 10 according to the present invention.

As shown in FIG. 5(a), an electric-supply-switch relay-circuit includes: first switch means 1 for passing an input current from an electric-supply line as a relay operating current; a relay 2 for performing switching operation in accordance with said relay operating current; and current detect control means 3 for detecting the input current. When the input current is found to be equal to or larger than a predetermined value necessary for operating the relay 2, the current detect control means 3 turns on the first switch means 1 to thereby allow the input current to the relay 2 side.

In addition, as shown in FIG. 5(b), an electric-supply-switch relay-circuit also has: current detect means 4 for detecting an input current from an electric-supply line; first switch means 1 for passing an input current from an electric-supply line as a relay operating current; a relay 2 for performing switching operation in accordance with the relay operating current; and switch control means 5 for detecting the input current. When the input current detected by the current detect means 4 is found to be equal to or larger than a predetermined value necessary for operating the relay 2, the switch control means 5 turns on the first switch means 1 to thereby allow the input current to the relay 2 side.

Further, as shown in FIG. 5(c), an electric-supply-switch relay-circuit, includes: current detect means 4 for detecting an input current from an electric-supply line; first switch means 1 for passing an input current from an electric-supply line as a relay operating current; a relay 2 for performing a switching operation in accordance with the relay operating current; second switch means 7 for passing a current from the current detect means 4 to an equivalent impedance element 8 of the relay 2; and switch change-over means 6 operating in accordance with a current detect signal which is received from the current detect means 4. The switch change-over means 6 turns on the first switch means 1 and turns off the second switch means 7 when the input current is larger than a predetermined value necessary for operating the relay 2, the switch change-over means 6 turning off first switch means 1 and turning on the second switch means 7 when the input current is smaller than the predetermined value.

In FIG. 5(a), the current detect control means 3 decides whether a current on a cable, including a current flowing through the current-detect control means 3, which flows toward the relay 2 has a current value (i.e., operation supporting current $I_{SP}$) which is sufficient to operate the relay 2. If the current is equal to or smaller than the current value, the first switch means 1 which is formed by a transistor switch or the like remains turned off. When the input current reaches or exceeds the current value, the first switch means 1 is turned on, whereby the relay 2 is driven into operation without fail by this operating current.

The structure shown in FIG. 5(b) is similar to the structure shown in FIG. 5(a) except that the current detect control means 3 of FIG. 5(a) is divided into the current detect means 4 disposed on a cable and the switch control means 5 which performs ON/OFF control of the first switch means 1 in accordance with a detect signal which is received from the current detect means 4. In the structure of FIG. 5(b), more accurate control is possible than with the structure of FIG. 5(a) since the input current on the cable is directly supervised in FIG. 5(b) whereas the current after shunting is supervised in FIG. 5(a).

In FIG. 5(c), the second switch means 7 is disposed in addition to the first switch means 1. To the second switch means 7, the equivalent impedance element 8 having an impedance (chiefly a dc resistance) which is equivalent to that of the relay 2 is connected. Similarly to the current detect control means 3 and the switch control means 5 mentioned above, when the input current is found to have a current value (i.e., operation supporting current $I_{SP}$) which is sufficient to operate the relay 2, the switch change-over means 6 turns on the first switch means 1 and turns off the second switch means 7. If the current is insufficient, the switch change-over means 6 turns off the first switch means 1 and turns on the second switch means 7. In the latter case, a current flows in the equivalent impedance element 8, and the current value of the current is similar to the current value of a current which flows towards the relay 2 in the former case. Hence, in the circuit structure according to the present invention, depending on switching operation of the first and the second switch means 1 and 7, the value of the input current would not change to thereby ensure operation which is similar to normal relay driving operation.

Figure 6:
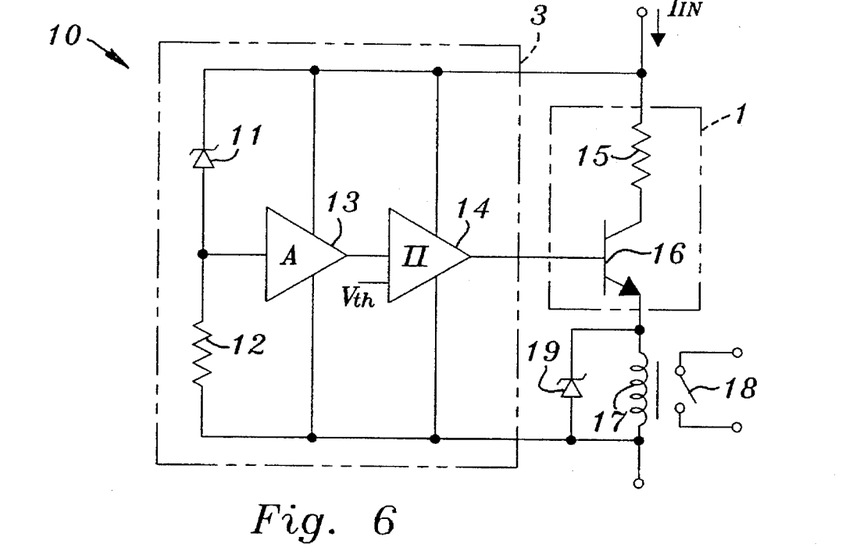
FIG. 6 is a circuit diagram showing an electricity supply switch relay-circuit according to a first preferred embodiment of the present invention.

FIG. 6 is a circuit diagram showing an electric-supply-switch relay-circuit according to a first embodiment of the present invention. The electric-supply-switch relay-circuit 10 of the present embodiment corresponds to the circuit structure which is shown in FIG. 5(a). A Zener diode 11, a resistor 12, an amplifier 13 and a Schmitt trigger-type comparator 14 of FIG. 6 correspond to the current detect control means 3 of FIG. 5(a). A resistor 15 and a transistor 16 of FIG. 6 correspond to the first switch means 1 of FIG. 5(a) while relay-circuits 17 to 19 of FIG. 6 correspond to the relay 2 of FIG. 5(a).

In FIG. 6, first, an input current $I_{IN}$ flows through the Zener diode 11 and the current detect resistor 12 which has a very small resistance (a few ohms). In the Zener diode 11, an operation power supply voltage is developed which will be supplied to inner circuits, i.e., the amplifier, the trigger and the like. In FIG. 6, a capacitor and the like for power supply noise reduction and the like are omitted for simplicity of illustration. The transistor 16 turns on when a predetermined value is reached by a voltage which is created across the current detect resistor 12, that is, when the input current $I_{IN}$ is shunted into a path towards the resistor 12 and a path towards the relay coil 17 and the input current $I_{IN}$ towards the resistor 12 has a current value which is sufficient to supply a large enough operating current toward the relay coil 17 so that a resultant voltage is amplified by the amplifier 13 to exceed a threshold value of the next stage trigger 14, and thereby the transistor 16 turns on. In this case, due to that condition, a large enough operating current ($I_{SP}$) flows in the relay coil 17, whereby a relay switch 18 operates without fail. In addition, as described above, since the resistance of the current detect resistor 12 is as small as a few ohms, the range of voltage variation due to migration of a portion of the current flowing in the current detect resistor 12 into the relay side would not exceed the threshold value of the Schmitt trigger-type comparator 14.

Figure 7:
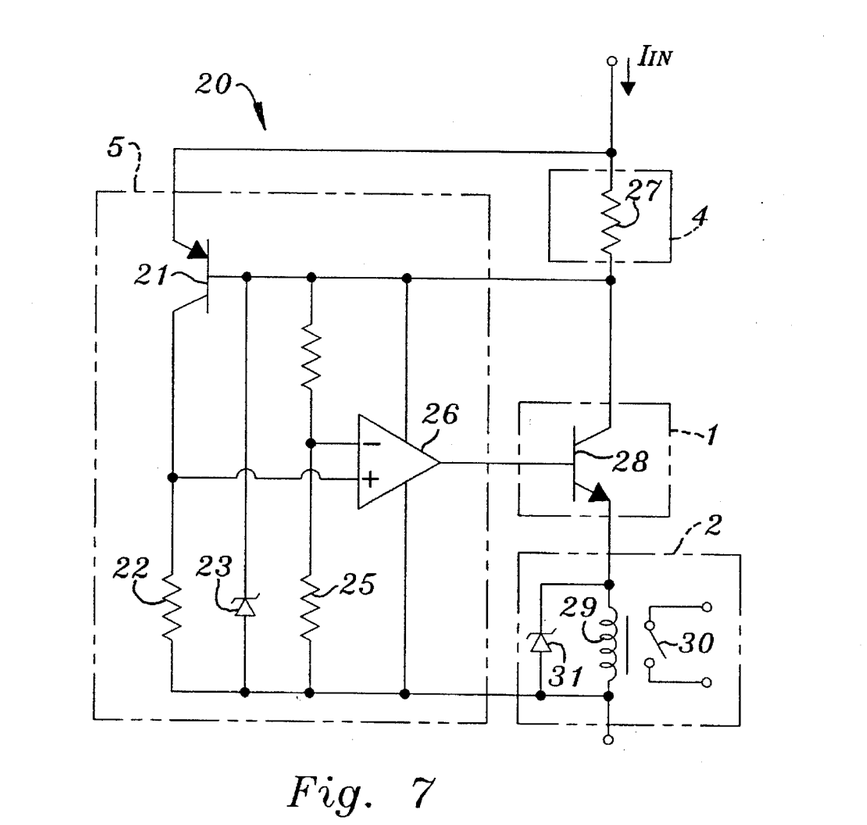
FIG. 7 is a circuit diagram showing an electric-supply-switch relay-circuit according to a second preferred embodiment of the present invention.

FIG. 7 is a circuit diagram showing an electric-supply-switch relay-circuit according to a second embodiment of the present invention. The electric-supply-switch relay-circuit 20 of the present embodiment corresponds to the circuit structure which is shown in FIG. 5(b). A current detect resistor 27 of FIG. 7 corresponds to the current detect means 4 of FIG. 5(b). A transistor 21, a load resistor 22, a Zener diode 23, divider resistors 24 and 25, and a comparator 26 of FIG. 7 correspond to the switch control means 5 of FIG. 5(b). A transistor 28 of FIG. 7 corresponds to the first switch means 1 of FIG. 5(b) while relay-circuits 29 to 31 of FIG. 7 correspond to the relay 2 of FIG. 5(b).

In FIG. 7, an input current $I_{IN}$ flows through the current detect resistor 27 and the Zener diode 23. The Zener diode 23 is used to generate an operating power supply voltage which will be supplied to the comparator 26 and to generate a threshold voltage of the comparator 26 by means of the divider resistors 24 and 25. In FIG. 7, a capacitor and the like for power supply noise reduction and the like are omitted for simplicity of illustration. The PNP transistor 21 turns on, when a voltage reaches a predetermined value. The voltage is created across the current detect resistor 27. That is, when a current from the current detect resistor 27 is shunted into a path towards the relay coil 29, a current is developed which causes a large enough operating current to flow in the relay coil 29 so that the voltage across the current detect resistor 27 becomes an ON voltage of the PNP transistor 21 ($V_{BE}$ around 0.8 V). Hence, a portion of the input current $I_{IN}$ flows in the load resistor 22 through the PNP transistor 21. Since a voltage developed at the load resistor 22 is higher than the threshold voltage which is created by the divider resistors 24 and 25, the output of the comparator 26 assumes a high level to thereby turn on the NPN transistor 28. Due to the that condition, large enough operating current ($I_{SP}$) flows through the relay coil 29, whereby relay switch 30 operates without fail. Namely, the PNP transistor 21 and the load resistor 22 form a control circuit for applying a switch change-over signal for switching from transistor 28 to the comparator 26.

Figure 8:
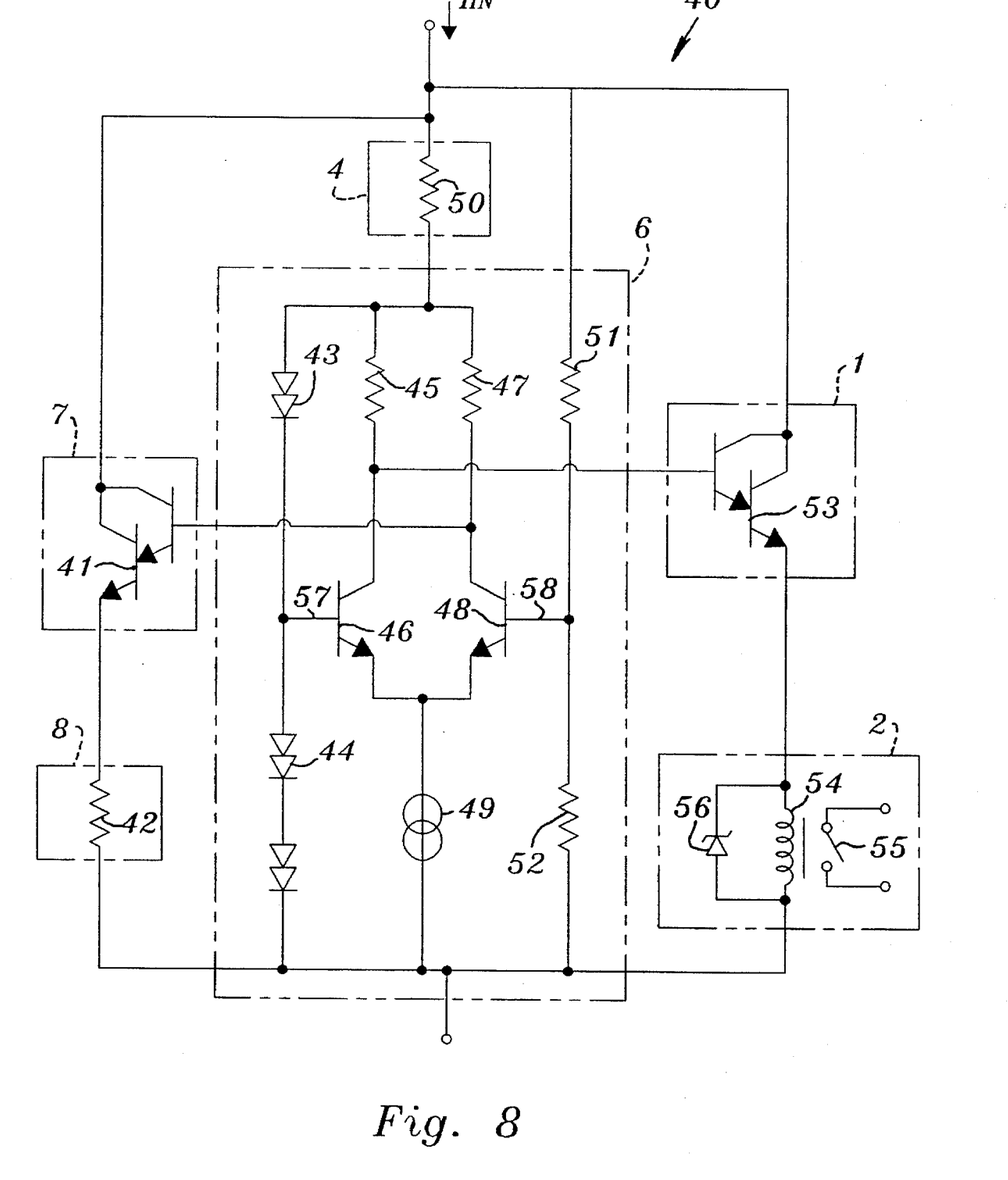
FIG. 8 is a circuit diagram showing an electric-supply-switch relay-circuit according to a third preferred embodiment of the present invention.

FIG. 8 is a circuit diagram showing an electric supply-switch relay-circuit according to a third embodiment of the present invention. The electric-supply-switch relay-circuit 40 of the present embodiment corresponds to the circuit structure which is shown in FIG. 5(c). A current detect resistor 50 of FIG. 8 corresponds to the current detect means 4 of FIG. 5(c). A comparator circuit which is comprised of differential transistors 46 and 48, load resistors 45 and 47, a constant current circuit 49, diode groups 43 and 44 and divider resistors 51 and 52 of FIG. 8 corresponds to the switch change-over means 6 of FIG. 5(c). Darlington output transistors 53 and 41 of FIG. 8 correspond to the first switch means 1 and the second switch means 7 of FIG. 5(c), respectively. A load resistor 42 of FIG. 8 corresponds to the equivalent impedance element 8 of FIG. 5(c) while relay-circuits 54 to 56 of FIG. 8 correspond to the relay 2 of FIG. 5(c).

In FIG. 8, first, an input current $I_{IN}$ flows through the current detect resistor 50 and the diode groups 43 and 44, which are serially connected to each other, to generate a circuit operating voltage. Each having a high resistance, the divider resistors 51 and 52, for detection of a voltage, exert almost no influence on the input current $I_{IN}$. The potential at a point between the two diode groups 43 (about 1.6 V) and 44 (about 12 V) is supplied to one input terminal of the comparator as a threshold voltage therefor. The differential transistors 46 and 48, their load resistors 45 and 47, the constant current circuit 49, which is formed by a transistor, a resistor, etc., form a comparator which is comprised of a differential amplifier. The comparison threshold voltage is given to one input 57 of the comparator while a potential at a point between the divider resistors 51 and 52, i.e., a detected value of the input current is supplied to the other input 58 of the comparator. In FIG. 8, a capacitor and the like for power supply noise reduction and the like are omitted for simplicity of illustration.

When a voltage across the current detect resistor 50 is equal to or less than a predetermined value, that is, when the input current detect value which is supplied to the one input 58 of the comparator is smaller than the comparison threshold voltage which is supplied to the other input 57 of the comparator, the output transistor 41 is turned on and the output transistor 53 is turned off so that a current flows towards the load resistor 42 side. Next, when the input current detect value exceeds the comparison threshold voltage which is supplied to the other input 57 of the comparator, due to an increase in the input current $I_{IN}$, the output transistor 41 is turned off and the output transistor 53 is turned on, creating a current flowing towards the relay coil 54 side. Since this current value is set by the current detect resistor 50 and the divider resistors 51 and 52 so as to develop a large enough operating current ($I_{SP}$) which is necessary to invoke relay operation, relay switch 55 operates without fail.

Figure 9:
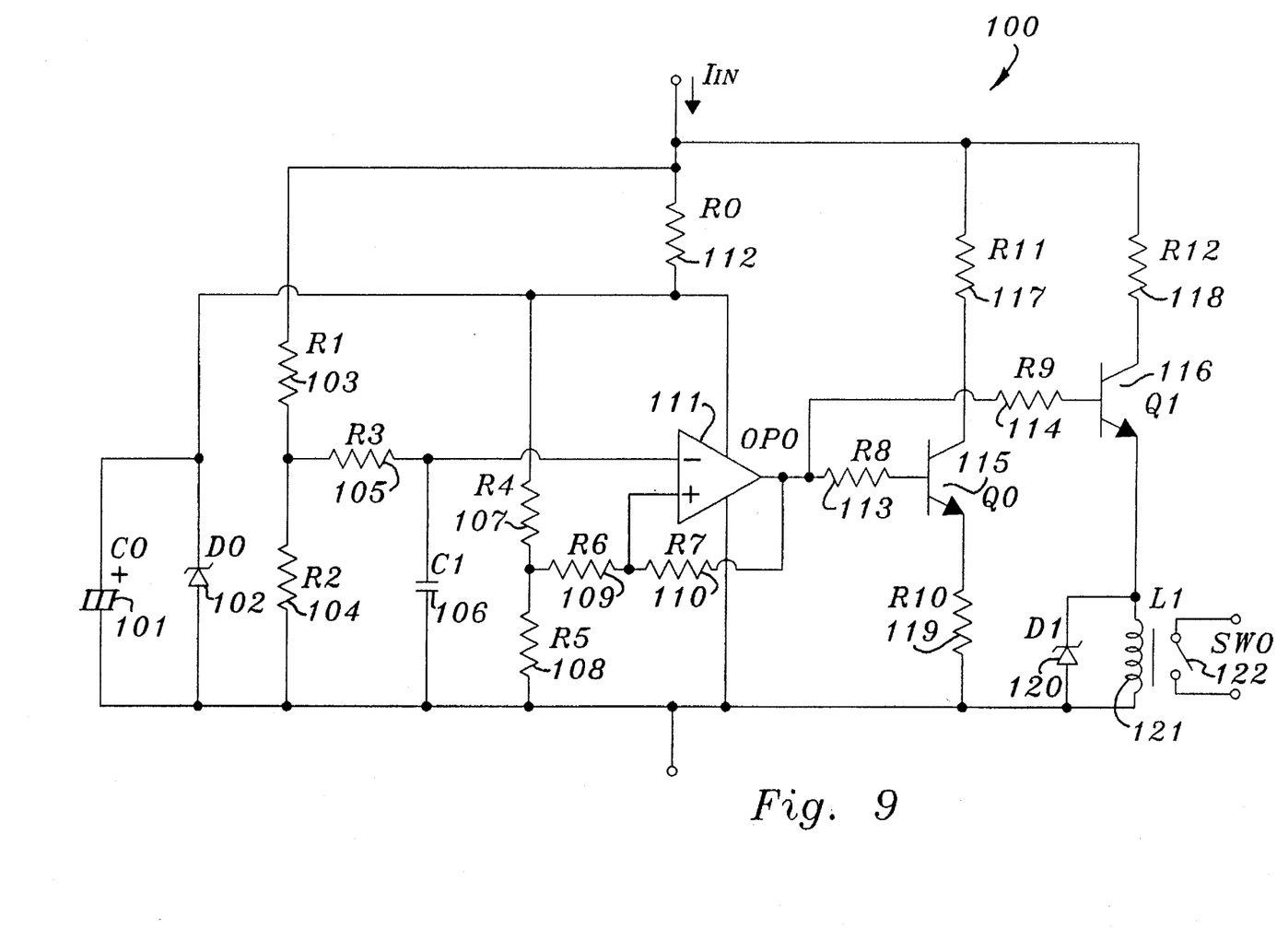
FIG. 9 is a circuit diagram showing an example of a circuit structure of the electric-supply-switch relay-circuit of FIG. 8.

FIG. 9 shows an example of a circuit structure of the electric-supply-switch relay-circuit which is shown in FIG. 8. To describe how the electricity supply switch relay-circuit 100 of FIG. 9 corresponds to the circuit of FIG. 8, a resistor (R0) 112 of FIG. 9 corresponds to the current detect resistor 50 of FIG. 8, resistors (R1, R2) 103 and 104 correspond to the divider resistors 51 and 52 of FIG. 8, respectively. A resistor (R3) 105 and a capacitor (C1) 106 form an integrating circuit for preventing impulse noise and the like from getting into the operational amplifier (OP0) 111. The operational amplifier 111 and resistors (R6, R7) 109 and 110 form a Schmitt type trigger. A Zener diode (D0) 102 and divider resistors (R4, R5) 107 and 108 provide the mean potential of the Schmitt trigger threshold range. These elements correspond to the differential amplifiers 45 to 49, the diode groups 43 and 44 and the like of FIG. 9. In FIG. 9, the operational amplifier 111 is constructed as a Schmitt trigger for the sake of more accurate comparison with reduced influence of a noise and the like. The Zener diode 102 also provides a power supply for the operational amplifier 111. The capacitor (C0), which is connected to the both ends of the Zener diode 102, serves as a bypass capacitor.

An NPN transistor (Q0) 115 and a PNP transistor (Q1) 116 of FIG. 9, which correspond to the Darlington output transistors 41 and 53 of FIG. 8, respectively, are complementary switches. A resistor (R10) 119 and relay-circuits 120 to 122 correspond to the load resistor 42 and the relay-circuits 54 to 56 of FIG. 8, respectively. The operation of the circuit of FIG. 9 is similar to that of the circuit of FIG. 8, and therefore, will not be described here.

As heretofore described, according to the present invention, a relay operating current is accurately determined despite a variation therein by an electronic circuit. Hence, there is no need to select the characteristics of the relays, which in turn makes it possible that the relays become less expensive.

Further, since the relay-circuit according to the present invention operates at a sufficient supporting current, adjusting steps for determining an operating point are reduced in number, thereby improving the reliability of the relay operation.

Since, according to the present invention, the relay operating current can be set at any desired value even within the range of the sufficient supporting current, the electricity supply switch relay-circuit of the present invention is very effective when used to perform current control for complex relay sequence control.

I claim:

1. An electric-supply-switch relay-circuit, comprising:

first switch means for passing an input current from an electric-supply line as a relay operating current; a relay for performing switching operations in accordance with said relay operating current provided via said first switch means;

and current detect control means for determining that said relay operating current is present, when an input current from said electric-supply line and flowing therethrough is determined to be equal to or larger than a predetermined value necessary for operating said relay, said current detect control means turning on said first switch means to thereby pass said relay operating current flowing therethrough before turning on said first switch means to said relay.

2. An electric-supply-switch relay-circuit as set forth in claim 1, wherein said current detect control means includes a current detect circuit for detecting a part of said input current, an amplifier for amplifying a signal detected by said current detect circuit, and a comparator for deciding whether said first switch means must be turned on by comparing a current value applied from said amplifier with a predetermined threshold value which is sufficient to supply an operating current to said relay.

3. An electric-supply-switch relay-circuit as set forth in claim 2, further including a power supply circuit for providing an operation power produced by said input current to said amplifier and said comparator.

4. An electric-supply-switch relay-circuit as set forth in claim 3, wherein said power supply circuit has a zener diode to generate a reference voltage.

5. An electric-supply-switch relay-circuit as set forth in claim 2, wherein said current detect circuit has very small resistance.

6. An electric-supply-switch relay-circuit as set forth in claim 2, wherein said comparator is a schmitt-comparator type comparator.

7. An electric-supply-switch relay-circuit as set forth in claim 1, wherein said first switch means is a semiconductor switch circuit.

8. An electric-supply-switch relay-circuit as set forth in claim 7, wherein said semiconductor switch circuit includes a transistor switch circuit.

9. An electric-supply-switch relay-circuit, comprising:

current detect means for determining that a relay operating current from an electric-supply line is present;

first switch means for passing an input current as said relay operating current provided via said current detect means;

a relay for performing switching operations in accordance with said relay operating current provided via said first switching means; and switch control means responsive to said current detect means for turning on said first switch means, when said input current detected by said current detect means is determined to be equal to or larger than a predetermined value necessary for operating said relay, to thereby pass said relay operating current provided via said current detect means and flowing therethrough before turning on said first switch means to said relay.

10. An electric-supply-switch relay-circuit as set forth in claim 9, wherein said current detect means for detecting an input current from a electric-supply line is a current detect resistor.

11. An electric-supply-switch relay-circuit as set forth in claim 9, wherein said first switch means is a semiconductor switch circuit.

12. An electric-supply-switch relay-circuit, comprising:

current detect means for determining that a relay operating current from an electric-supply line is present; first switch means for passing an input current from said electric-supply line as a relay operating current;

a relay for performing switching operations in accordance with said relay operating current; and switch control means responsive to said current detect means for turning on said first switch means, when said input current detected by said current detect means is determined to be equal to or larger than a predetermined value necessary for operating said relay, to thereby allow said relay operating current to pass via said current detect means to said relay, only when said input current is equal to or larger than said predetermined value;

wherein said switch control means includes a comparator for turning said first switching means on or off, a threshold and shunt circuit for applying a threshold value to one input terminal of said comparator and providing a shunt path for said input current, and a control circuit for applying a switch change-over signal to another input terminal of said comparator.

13. An electric-supply-switch relay-circuit as set forth in claim 12, wherein said threshold and shunt circuit includes a zener diode for making a reference voltage and bypassing a part of said input current, and divider resistors for producing said threshold value by using said reference voltage.

14. An electric-supply-switch relay-circuit as set forth in claim 12, wherein said control circuit includes a load resistor and a switching part for passing a part of said input current under control of said current detecting means, to produce the switch change-over signal by sensing a part of said input current flowing through said load resistor and said switching part.

15. An electric-supply-switch relay-circuit as set forth in claim 14, wherein said switching part is a transistor switch circuit.

16. An electric-supply-switch relay-circuit, comprising:

current detect means for determining that an input current from an electric-supply line is present; first switch means for passing an input current from said electric-supply line and said current detect means as a relay operating current; a relay for performing switching operations in accordance with said relay operating current said relay being operated from the electric supply line without loading said first switch means; second switch means for passing said relay operating current from said current detect means to an equivalent impedance element of said relay; and switch change-over means operating in accordance with a current detect signal which is received from said current detect means, said switch change-over means turning on said first switch means and turning off said second switch means when said input current is larger than a predetermined value necessary for operating said relay, said switch change-over means turning off said first switch means and turning on said second switch means when said input current is smaller than said predetermined value.

17. An electric-supply-switch relay-circuit as set forth in claim 16, wherein said switch change-over means includes a differential amplifier for comparing a signal value applied from said current detect means with a predetermined threshold value and thereby controlling said first switch means and said second switch means in a complementary operation, a threshold circuit for generating said predetermined threshold value and providing it to one input terminal of said differential amplifier, and an adjusting circuit for adjusting the value of a signal applied by said current detect means and providing it to another input terminal of said differential amplifier.

18. An electric-supply-switch relay-circuit as set forth in claim 17, wherein said adjusting circuit is a divider resistor circuit.

19. An electric-supply-switch relay-circuit as set forth in claim 16, wherein said equivalent impedance element is a resistor which has the same resistance as the DC resistance of said relay.

20. An electric-supply-switch relay-circuit as set forth in claim 12, wherein each of said first switch means and said second switch means is a semiconductor switch circuit.

21. An electric-supply-switch relay-circuit as set forth in claim 16, wherein said current detect means is a current detect resistor.

* * * * *

UNITED STATES PATENT AND TRADEMARK OFFICE
CERTIFICATE OF CORRECTION

PATENT NO. : 5,590,013
DATED : December 31, 1997
INVENTOR(S) : Harasawa

It is certified that error appears in the above-indentified patent and that said Letters Patent is hereby corrected as shown below:

Column 1, line 34, after "sequence", delete "the".

Column 2, line 7, after "detecting", delete "said" and insert --the--.

Column 2, line 8, after "When", delete "said" and insert --the--.

Column 3, line 36, delete "()" and insert --(•)--.

Column 4, line 22, delete "10".

UNITED STATES PATENT AND TRADEMARK OFFICE
CERTIFICATE OF CORRECTION

PATENT NO. : 5,590,013
DATED : December 31, 1997
INVENTOR(S) : Harasawa

It is certified that error appears in the above-indentified patent and that said Letters Patent is hereby corrected as shown below:

Column 6, line 42, after "Due to", delete "the".

Column 8, line 12, before "sufficient", delete "the".

Column 8, line 50, delete "schmitt-comparator" and insert --schmitt-trigger--.

Signed and Sealed this

Seventh Day of October, 1997

Attest:

BRUCE LEHMAN

Attesting Officer

Commissioner of Patents and Trademarks